United States Patent
Hickey et al.

(10) Patent No.: US 10,254,485 B2
(45) Date of Patent: Apr. 9, 2019

(54) OPTICAL RING RESONATOR STRUCTURE WITH A BACKSIDE RECESS

(71) Applicant: RANOVUS INC., Ottawa (CA)

(72) Inventors: Ryan Murray Hickey, Stittsville (CA); Dylan Logan, Ottawa (CA); Christopher James Brooks, Nepean (CA)

(73) Assignee: RANOVUS INC., Ottawa, Ontario (CA)

( * ) Notice: Subject to any disclaimer, the term of this patent is extended or adjusted under 35 U.S.C. 154(b) by 0 days.

(21) Appl. No.: 15/699,142

(22) Filed: Sep. 8, 2017

(65) Prior Publication Data

US 2018/0074263 A1 Mar. 15, 2018

Related U.S. Application Data

(60) Provisional application No. 62/385,498, filed on Sep. 9, 2016.

(51) Int. Cl.
*G02B 6/32* (2006.01)
*G02B 6/293* (2006.01)
*G02F 1/01* (2006.01)

(52) U.S. Cl.
CPC ..... *G02B 6/29395* (2013.01); *G02B 6/29338* (2013.01); *G02F 1/011* (2013.01);
(Continued)

(58) Field of Classification Search
CPC ... G02F 1/0147; G02F 1/011; G02B 6/29338; G02B 6/29395
See application file for complete search history.

(56) References Cited

U.S. PATENT DOCUMENTS

| | | | |
|---|---|---|---|
| 8,638,178 B1* | 1/2014 | Wang | H03H 3/0075 310/344 |
| 2009/0050487 A1 | 2/2009 | Fang et al. | |

(Continued)

FOREIGN PATENT DOCUMENTS

WO    WO-2016011002 A1    1/2016

OTHER PUBLICATIONS

International Search Report, dated Jan. 9, 2018, by ISA/CA, re PCT International Patent Application No. PCT/IB2017/055442.
(Continued)

*Primary Examiner* — Thomas A Hollweg
*Assistant Examiner* — Mary A El-Shammaa
(74) *Attorney, Agent, or Firm* — Perry + Currier, Inc.

(57) ABSTRACT

An optical ring resonator structure with a backside recess is provided at a device. The device includes: a substrate having a device-side and a backside opposite the device-side; an optical ring resonator located on the device-side of the substrate; a heater having a shape complementary to the optical ring resonator, the heater positioned to heat the optical ring resonator; and one or more metal traces that connect at least to the heater, the metal traces configured to provide power to the heater and extending outward from the heater. The device further includes a recess on the backside of the substrate, the recess centered on the optical ring resonator, and having a diameter larger than both respective outer diameters of the optical ring resonator and the heater, the recess further extending laterally into a region of the one or more metal traces.

16 Claims, 4 Drawing Sheets

(52) U.S. Cl.
CPC .... *G02F 1/0147* (2013.01); *G02F 2001/0113* (2013.01); *G02F 2201/12* (2013.01); *G02F 2203/15* (2013.01); *G02F 2203/60* (2013.01)

(56) References Cited

U.S. PATENT DOCUMENTS

| | | | |
|---|---|---|---|
| 2015/0125111 A1 | 5/2015 | Orcutt et al. | |
| 2015/0132015 A1* | 5/2015 | Hayakawa | G02F 1/025 |
| | | | 398/200 |
| 2015/0160482 A1* | 6/2015 | Amberg | G02F 1/0147 |
| | | | 385/1 |
| 2015/0192803 A1* | 7/2015 | Lee | G02F 1/0147 |
| | | | 385/3 |
| 2016/0334650 A1* | 11/2016 | Dumais | G02F 1/025 |

OTHER PUBLICATIONS

Written Opinion, dated Jan. 9, 2018, by ISA/CA, re PCT International Patent Application No. PCT/IB2017/055442.

\* cited by examiner

OPTICAL RING RESONATOR STRUCTURE WITH A BACKSIDE RECESS

CROSS-REFERENCE TO RELATED APPLICATION(S)

This application claims priority from U.S. Provisional Patent Application No. 62/385,498, filed Sep. 9, 2016, which is incorporated herein by reference.

FIELD

The specification relates generally to telecommunication devices, and specifically to an optical ring resonator structure with a backside recess.

BACKGROUND

Resonance frequencies of optical ring resonators are stabilized using integrated heaters, which heat an optical ring resonator to a given temperature. However, various mechanisms cause heat to flow out of the area of the optical ring resonators, including flow of heat into a substrate, which is further facilitated by flow of heat along metal traces to the heaters and any voltage control device used to control modulation at the optical ring resonator. Various techniques have been used to localize heat produced by the heaters at optical ring resonators, for example etching along sides of the devices into the substrate, and under the devices, however such techniques are difficult to implement and require masking of the optical ring resonators, associated devices and metal traces, as well as very careful control of the etching under the optical ring resonators to ensure adequate yield.

SUMMARY

The present specification provides a device that includes an optical ring resonator structure on a device-side of a substrate, with a corresponding recess on the backside of the substrate, the recess centered on the optical ring resonator, and having a diameter larger than both respective outer diameters of the optical ring resonator and an associated heater, the recess further extending laterally into a region of one or more metal traces that connect at least to the heater. Hence, there is a layer of material between a side of the recess adjacent the device-side of the substrate in the area of the optical ring resonator structure, and upon which the optical ring resonator structure is located. The layer of material can include an insulator (such as an oxide) on the substrate and/or substrate material. Hence, the optical ring structure is thermally isolated from the substrate by virtue of the recess, at least compared to optical ring resonator structures lacking such a recess, and in which the substrate acts as a heat sink. Further, the recess is far simpler to implement than side etching around the optical ring resonator structure and can result in relatively fewer mistakes in etching, which can lead to an overall increase in yield. The recess can be etched using techniques associated with through-silicon vias, though the recess is not through the substrate, and the substrate need not be silicon. In general, a diameter of the recess can be at least 50 microns larger than both the respective outer diameters of the optical ring resonator and the heater, and further can be selected such that a fraction heat extraction contribution of one or metal traces connected to the heater is below about 10%; however, a diameter of the recess can be smaller than this as long as the recess extends laterally into a region of one or more metal traces that connect at least to the heater. In other words, while heat can flow out of the optical ring resonator structure via the metal traces, as the metal traces are also at least partially heat isolated, by virtue of the recess being thereunder, the overall contribution of heat extraction by the metal traces can be reduced.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

An aspect of the specification provides a device comprising: a substrate having a device-side and a backside opposite the device-side; an optical ring resonator located on the device-side of the substrate; a heater having a shape complementary to the optical ring resonator, the heater positioned to heat the optical ring resonator; one or more metal traces that connect at least to the heater, the metal traces configured to provide power to the heater and extending outward from the heater; and, a recess on the backside of the substrate, the recess centered on the optical ring resonator, and having a diameter larger than both respective outer diameters of the optical ring resonator and the heater, the recess further extending laterally into a region of the one or more metal traces.

The device can further comprise: one or more electrodes configured to provide a voltage to the optical ring resonator, the one or more electrodes having an outer diameter larger than the optical ring resonator; and one or more further metal traces that connect to the one or more electrodes and extending outward from the one or more electrodes, the recess having a diameter larger than outer diameters of the one or more electrodes, the recess further extending laterally into a region of the one or more further metal traces.

The substrate can comprise a silicon substrate.

The heater can have a shape complementary to the optical ring resonator.

The device can further comprise an insulator material encapsulating the optical ring resonator, and the heater.

The device can further comprise a layer of material a side of the recess adjacent the device-side of the substrate. The layer of material can have a thickness in a range of about 2 microns to about 3 microns. The layer of material can comprise an insulator material. The layer of material can comprise an oxide material.

The recess can have a diameter that is at least 50 microns larger than both the respective outer diameters of the optical ring resonator and the heater.

The recess can have a diameter that causes a fraction heat extraction contribution of the one or metal traces to be below 10%.

The optical ring resonator can be located between the device-side of the substrate and the heater.

The recess can comprise a partially through-silicon via.

The device can further comprise: a plurality of optical ring resonators, a plurality of heaters, and a plurality of metal traces, all in a one-to-one relationship, and arranged on the device-side of the substrate; and a plurality of recesses in the backside of the substrate, in a one-to-one relationship with the plurality of optical ring resonators. The device can further comprise a spacing between the plurality of optical ring resonators that minimizes heat flow there between.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
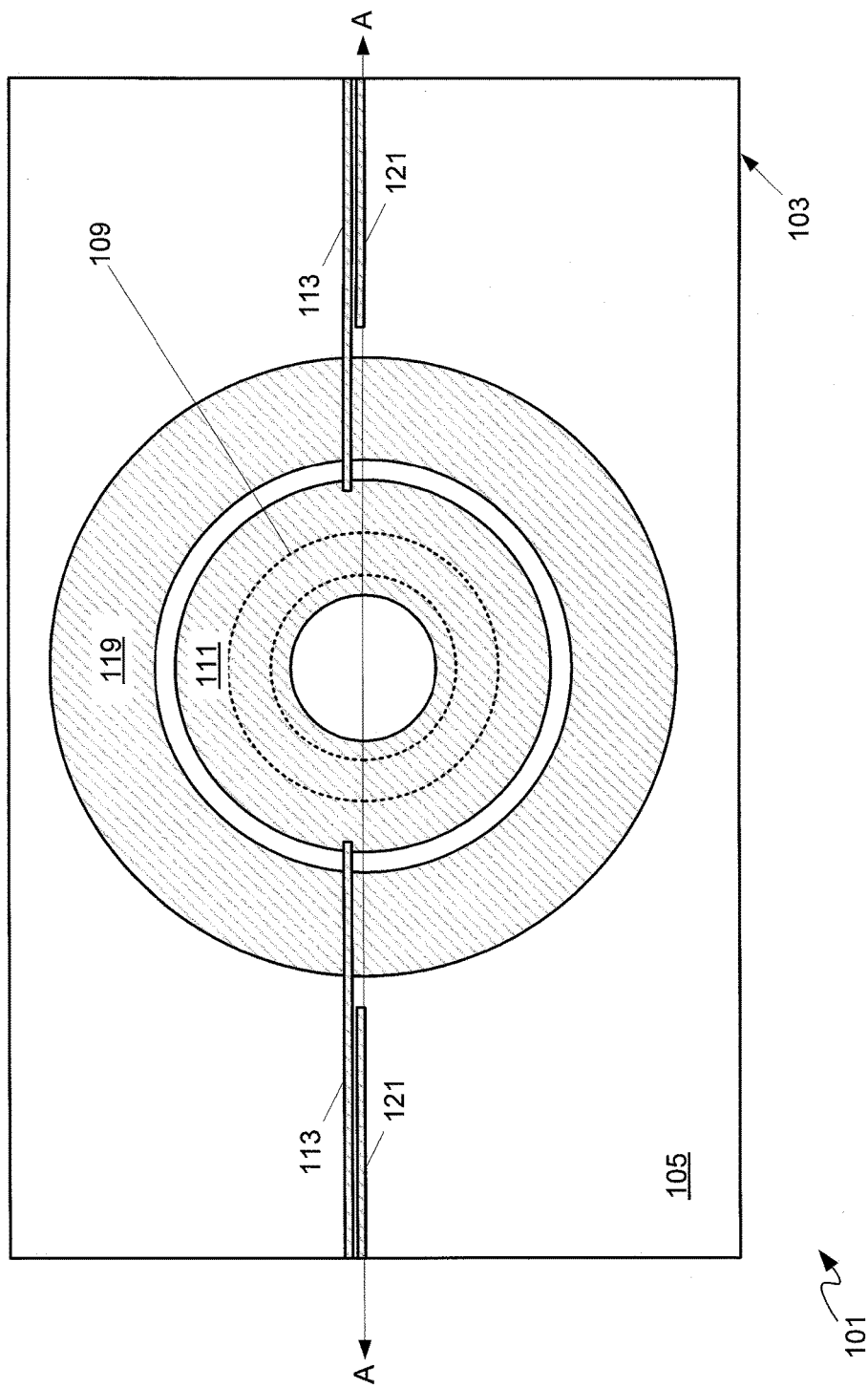
FIG. 1 depicts a device-side perspective view of device that includes an optical ring resonator structure with a backside recess, according to non-limiting implementations.
Figure 2:
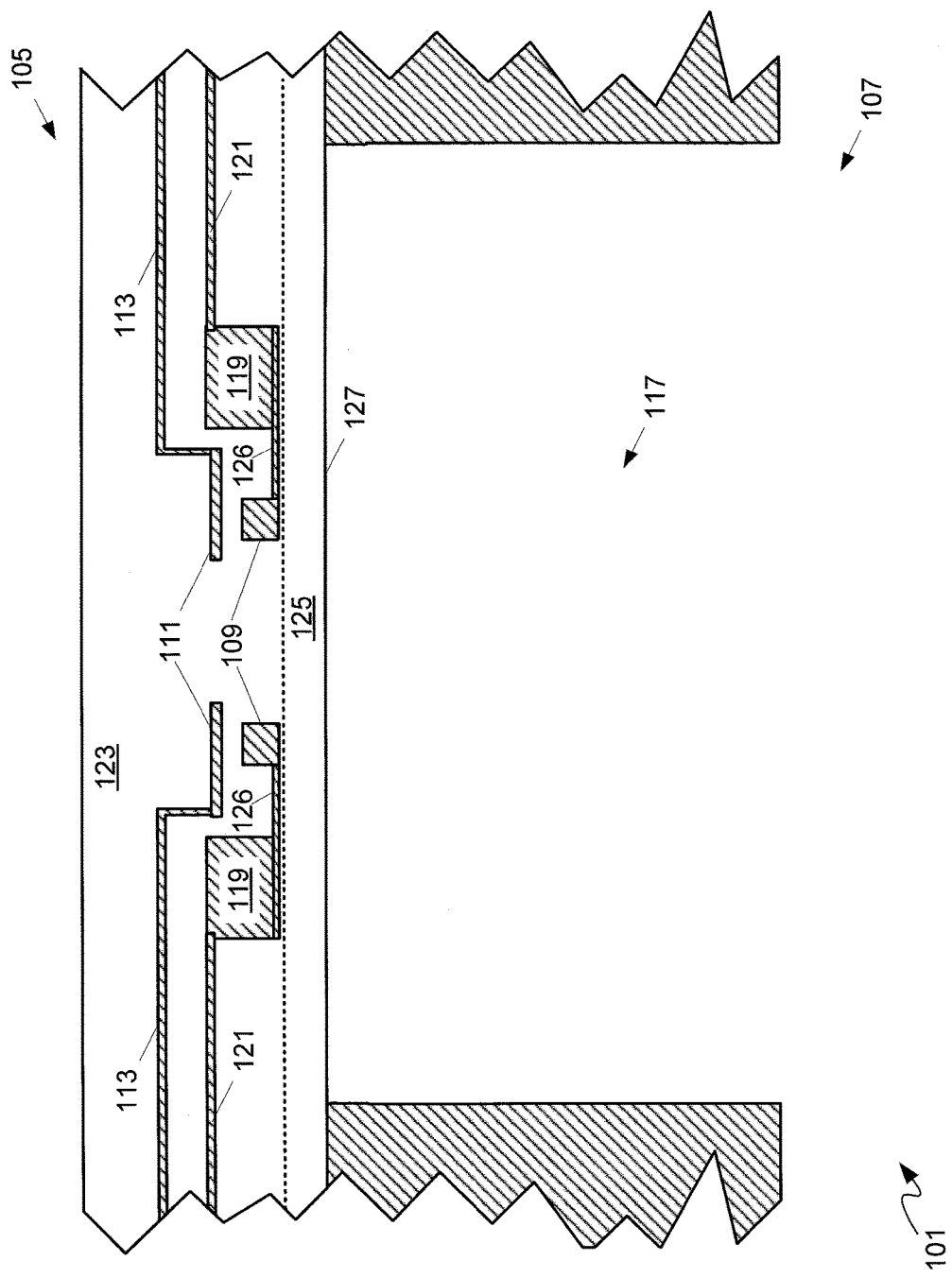
FIG. 2 depicts a cross-section of the device of FIG. 1, through a line A-A, however metal traces are depicted differently from FIG. 1 to demonstrate different configurations thereof, according to non-limiting implementations.

Attention is directed to FIGS. 1 and 2 which respectively depict a schematic device-side view of a device 101, and a schematic cross-section of device 101 through a line A-A. Device 101 comprises: a substrate 103 having a device-side 105 and a backside 107 opposite device-side 105; an optical ring resonator 109 located on device-side 105 of substrate 103; a heater 111 positioned to heat optical ring resonator 109; one or more metal traces 113 that connect at least to heater 111, metal traces 113 configured to provide power to heater 111 and extending outward from heater 111; and a recess 117 on backside 107 of substrate 103, recess 117 centered on optical ring resonator 109, and having a diameter larger than both respective outer diameters of optical ring resonator 109 and heater 111, recess 117 further extending laterally into a region of one or more metal traces 113. As depicted, device 101 further comprises one or more electrodes 119 configured to provide a voltage to optical ring resonator 109, one or more electrodes 119 having an outer diameter larger than optical ring resonator 109; and one or more further metal traces 121 that connect to one or more electrodes 119 and extending outward from the one or more electrodes 119, recess 117 having a diameter larger than outer diameters of one or more electrodes 119, recess 117 further extending laterally into a region of the one or more further metal traces 121.

As depicted, device 101 further comprises an insulator material 123, for example an oxide material, encapsulating device 101, including optical ring resonator 109, and heater 111, as well as one or more electrodes 119 and metal traces 113, 121. Furthermore, a layer 125 of insulator material is generally located between optical ring resonator 109 and recess 117 and/or substrate 103. For example, in some implementations, substrate 103 can comprise a silicon substrate and insulator material 123 can comprise silicon oxide, with at least a layer 125 of insulator between optical ring resonator 109 and substrate 103 being a thermal silicon oxide, while the remainder of insulator material 123 can be deposited using any suitable deposition technique, including but not limited to, physical vapour deposition techniques, chemical vapour deposition techniques, combinations thereof, and the like. Indeed, any suitable method of manufacture of device 101 is within the scope of present implementations. For example, in some implementations, device 101 can be fabricated from a silicon-on-insulator (SOI) substrate, with the optical ring resonator 109 being formed from the silicon layer of the SOI substrate, and a layer 125 of insulator comprising the insulator layer of the SOI substrate. However, layer 125 can be deposited on substrate 103 prior to forming other components of device 101.

Both of heater 111 and one or more electrodes 119 are appreciated to be depicted schematically; for example, both heater 111 and one or more electrodes 119 are depicted as being located at specific positions with respect to optical ring resonator 109 and/or in one or more planes adjacent a depicted plane of a respective optical ring resonator 109. For example, heater 111 is depicted as being "above" optical ring resonator 109 (e.g. out of the page of FIG. 2), and one or more electrodes 119 are depicted as being outside optical ring resonator 109, however their actual locations can vary.

Indeed, it is appreciated that both of heater 111 and one or more electrodes 119 are components of an optical ring resonance structure that includes optical ring resonator 109; in general, heater 111 is used to tune optical ring resonator 109 to a given respective frequency, while one or more electrodes 119 are used to change the optical properties of optical ring resonator 109 between two different values to, in turn, modulate respective optical signals being tuned by optical ring resonator 109. As depicted, heater 111 has a shape complementary to optical ring resonator 109: both are annular in shape for even heating of optical ring resonator 109. Furthermore, as depicted, one or more electrodes 119 are in electrical communication with optical ring resonator 109 using one or more traces 126, which can comprise a material similar to optical ring resonator 109 and/or one or more electrodes 119. In particular, when optical ring resonator 109 comprises silicon, each of one or more traces 126 can also comprise silicon. In some implementations, optical ring resonator 109 can be about 220 nm thick, while one or more traces 126 can be about 90 nm thick; indeed, dimensions of one or more traces 126 are selected so as to not optically interfere with functionality of optical ring resonator 109.

However, in some implementations, one or more electrodes 119 (and, similarly, one or more traces 126) can be optional, for example in implementations where heater 111 alone is used to tune and/or control optical ring resonator 109.

Either way, metal traces 113, 121 extend out of device 101 to an electrical interface (not depicted) where metal traces 113, 121 can connect with an electrical driver chip, and the like, that provides power and/or electrical signals to metal traces 113, 121 and, subsequently, to heater 111 and one or more electrodes 119.

Furthermore, locations of metal traces 113,121 depicted in FIGS. 1 and 2 are schematic only, and are depicted differently in each of FIGS. 1 and 2 for clarity, and to demonstrate different configurations thereof. For example, in FIG. 1, metal traces 113, 121 are drawn side-by-side, and in FIG. 2, metal traces 113, 121 are drawn on top of one another to show that they are both present. In practise, either configuration can be used as well as other configurations. Metal traces 113, 121 are also depicted as extending from opposite sides of device 101, however, in some implementations, metal traces 113, 121 can extend from one side only of device 101. The configuration of metal traces 113, 121 are generally compatible with a configuration of heater 111 and one or more electrodes 119. For example, while only one electrode 119 is depicted for clarity, two electrodes can be used to control a voltage across optical ring resonator 109 and hence a metal trace 113 can be provided for each of the two electrodes in a one-to-one relationship.

It is further noted that, as FIG. 1 is a device-side perspective view of device 101, and as optical ring resonator 109 is located between heater 111 and substrate 103, in FIG. 1 optical ring resonator 109 is depicted in outline to indicate that optical ring resonator 109 is located "beneath" heater 111.

In addition, in FIG. 2, lateral sides of substrate 103 are depicted as being broken to indicate the substrate 103 can extend laterally outward.

Recess 117 can be formed using any suitable technique, for example after the remainder of device 101 has been fabricated. It is appreciated that, as depicted, recess 117 does not go through substrate 103 but nonetheless recess 117 can comprise a partially through-silicon via, assuming that substrate 103 comprises silicon. In other words, etching techniques associated with through-silicon vias can be used to form recess 117; when substrate 103 comprises a material other silicon, similar etching techniques can be used to form recess 117 adjusted, however, for the material of substrate 103.

Furthermore, it is appreciated that recess 117 refers to an absence of material at backside 107 of substrate 103 and that the term recess can interchangeably be used with one or more of cavity, indentation, hollow, slot, dent, depression, and the like. Regardless, a portion of substrate 103 is removed from backside 107 to form recess 117 leaving a layer 125 of material at a side 127 of recess 117 adjacent device-side 105 of substrate 103.

In particular, layer 125 can be used as an etch-stop for such etching; in particular, photolithographic techniques, and the like, can be used to select a region of backside 107 of substrate 103 for etching, and layer 125 used as an etch-stop. In general, layer 125 can be in a range of about 2 microns to about 3 microns thick such that other components of device 101 are located on about a 2 micron to about 3 micron layer of insulator material, such as an oxide. In particular implementations, substrate 103 can be thinned to about 500 microns by polishing backside 107 of substrate 103. Photolithographic techniques can be used to form holes in a mask layer on backside 107 and an etch process (which can include, but is not limited to, chemical etching, dry-plasma etching and the like) can be used to etch recess 117 to layer 125, which acts as an etch stop. In these implementations, the remaining components of device 101 other components of device 101 are located on about a 2 micron to about a 3 micron layer of insulator material with no other substrate material underneath. As the remainder of insulator material 123 can also be in a range of about 2 microns to about 3 microns, a total thickness of insulator material 123 can be in a range of about 4 microns to about 6 microns. While layer 125 can be of a material similar to the remainder of insulator material 123, layer 125 is designated by a stippled line in FIG. 2 to show both a location of layer 125 and to distinguish layer 125 from the remainder of insulator material 123.

However, in other implementations, etching of recess 117 can be stopped prior to reaching layer 125 of insulator, for example by controlling an etching time; hence, a thickness of layer 125 (which can, in these implementations, include a layer of substrate material) can be selected that balances thermal isolation of optical ring resonator 109 and physical integrity of device 101.

Furthermore, recess 117 can have a shape complementary to optical ring resonator 109. For example, as optical ring resonator 109 is annular, recess 117 can be circular in lateral cross-section (e.g. cylindrically shaped). Either way, recess 117 extends at least partially into a region of metal traces 113 and, if present, metal traces 121. In some implementations, recess 117 has a diameter that is at least 50 microns larger than both the respective outer diameters of optical ring resonator 109 and heater 111 and/or a diameter that is at least 50 microns larger than the respective outer diameter of one or more electrodes 119. Specifically, a diameter of recess 117 can be at least 50 microns larger than the largest outer diameter of optical ring resonator 109, heater 111 and one or more electrodes 119 (when present) to ensure thermal isolation of all of optical ring resonator 109, heater 111 and one or more electrodes 119 (when present). However, recess 117 need not be cylindrical as long as recess 117 extends laterally into a region of one or more metal traces 113, 121.

Indeed, using thermal modelling techniques and/or heuristic techniques and/or by experimentation, a diameter and/or a size of recess 117 is selected that causes a fraction heat extraction contribution of one or metal traces 113, 121 to be below about 10%.

Figure 3:
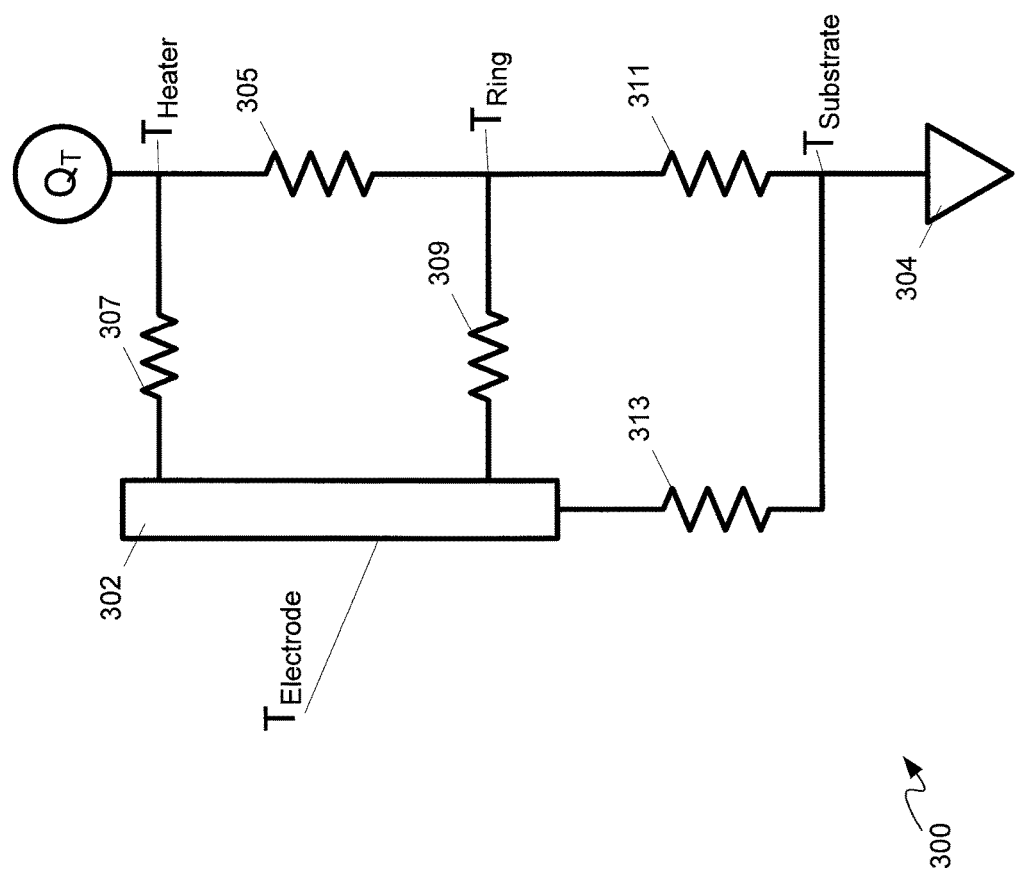
FIG. 3 depicts a simplified thermal model of the device of FIGS. 1 and 2, according to non-limiting implementations.

For example, attention is next directed to FIG. 3 which depicts a simplified thermal model 300 of device 101. Resistors depicted in FIG. 3 are appreciated to be thermal resistors. The positions of each of heater 111, optical ring resonator 109 and one or more electrodes 119 in thermal model 300 are indicated by temperatures thereof. For example, temperature $T_{Heater}$ corresponds to both a temperature of heater 111 and a position of heater 111 within model 300, $T_{Ring}$ corresponds to both a temperature of optical ring resonator 109 and a position of optical ring resonator 109 within model 300, and temperature $T_{Electrode}$ corresponds to both a temperature of one or more electrodes 119 and a position one or more electrodes 119 within model 300. One or more electrodes 119 are represented as a heat sink 302 as one or more electrodes 119 can be thermally "large" as compared to heater 111 and/or optical ring resonator 109. Furthermore, substrate 103 is represented by a thermal ground 304.

In particular heat is supplied by a power/heat supply $Q_T$ to heater 111 to heat heater 111 to a temperature $T_{Heater}$, for example under control of a controller (not depicted). Heat from heater 111 flows to optical ring resonator 109, to bring a temperature of optical ring resonator 109 to $T_{Ring}$, the heat flowing through insulator material 123 separating heater 111 and optical ring resonator 109; hence the thermal resistance of the insulator material 123 there between is represented in thermal model 300 as thermal resistor 305. However, some of the heat from heater 111 and heat from optical ring resonator 109 also flows into one or more electrodes 119 via insulator material 123 separating heater 111 and one or more electrodes 119; hence insulator material 123 separating optical ring resonator 109 and one or more electrodes 119 is respectively represented by thermal resistors 307, 309. Furthermore, heat flows from optical ring resonator 103 into substrate 103, for example via layer 125, as represented by thermal resistor 311; and heat flows out of heater 111 and out of one or more electrodes 119 through metal traces 113, 121, and then into substrate 103, as represented by thermal resistor 313.

In implementations where one or more electrodes 119 are not present in device 101, heat sink 302 is eliminated, and/or reduced, and thermal resistors 307, 309 and 313 are shorted to one another.

Either way, in device 101, recess 117 (represented by thermal resistor 311) reduces a flow of heat from optical ring resonator 109 into substrate 103. For example, in the prior art, where recess 117 is not present, thermal resistor 311 is replaced by a short to thermal ground 304 such that heat flows directly into thermal ground 304 from optical ring resonator 109. Hence, by forming recess 117 on backside 107 of substrate 103, heat can be localized at optical ring resonator 109, which can reduce the overall power used in device 101 to bring optical ring resonator 109 to a given temperature.

While some heat continues to flow into substrate 103 via metal traces 113, 121, recess 117 also extends laterally into a region of metal traces 113, 121 to increase the thermal resistance between metal traces 113, 121 and substrate 103. In other words, the further recess 117 extends into a region of metal traces 113, 121, the larger thermal resistor 313. Hence, a diameter, and the like, of recess 117 can be selected to bring a fraction heat extraction contribution of the one or metal traces to below about 10%.

Figure 4:
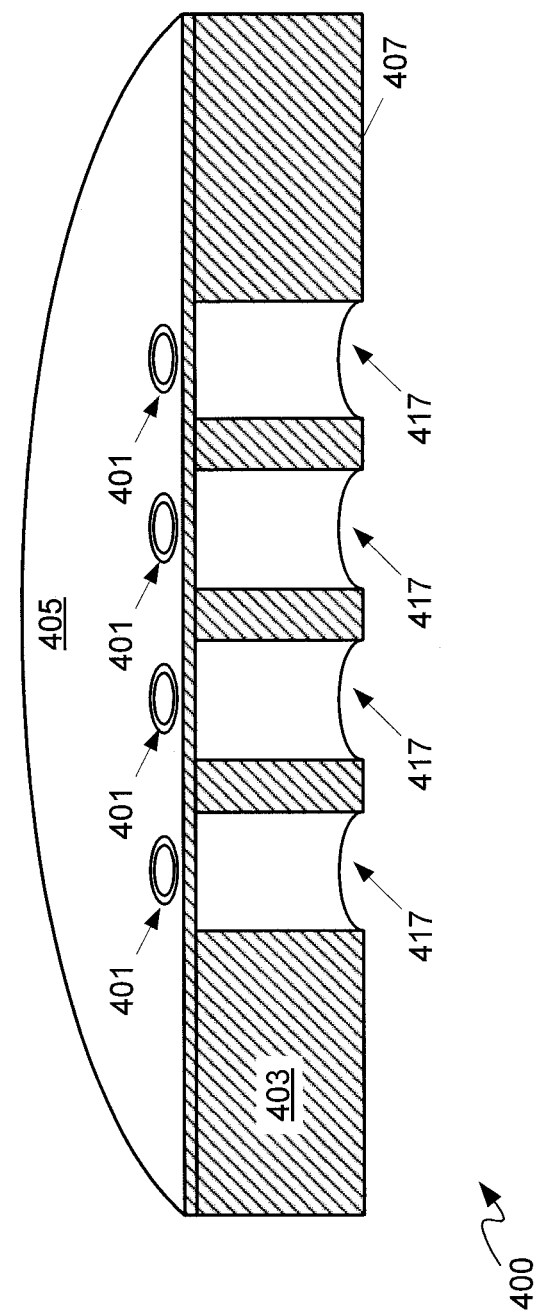
FIG. 4 depicts a partial cross-section of a device that includes a plurality of optical ring resonator structures and plurality of associated backside recesses in one-to-one relationship, according to non-limiting implementations.

In some implementations, device 101 can be one of a plurality of similar devices on a common substrate. For example, attention is next directed to FIG. 4 which depicts a partial cross-section of a device 400 comprising a plurality of devices 401, each similar to device 101, each including an optical ring resonator structure (as represented by the depicted annuluses) on a device-side 405 of a substrate 403, and an associated recess 417 in a backside 407 of substrate 403. While details of each device 401 are not depicted, each device 401 comprises an optical ring resonator, a heater, metal traces, an associated recess 417 and, optionally, one or more electrodes. Hence, device 400 comprises: a plurality of optical ring resonators, a plurality of heaters, and a plurality of metal traces, all in a one-to-one relationship, and arranged on device-side 405 of substrate 403; and a plurality of recesses 417 in backside 407 of the substrate, in a one-to-one relationship with the plurality of optical ring resonators. Device 401 is depicted in partial cross-section to show a general cylindrical shape of recesses 417, however recesses 417 can be a shape other than cylindrical.

Furthermore, a spacing between plurality of optical ring resonators in devices 401 is selected that minimizes heat flow there between to localize heat from respective heaters at respective optical ring resonators. For example, in a thermal model of devices 401, each device 401 can be represented similar to thermal model 300 with an additional thermal resistor between each device 401; the spacing between plurality of optical ring resonators in devices 401 is selected to maximize such a thermal resistance while also making use of the physical space available on substrate 403.

While devices 401 are depicted as being spaced along a line on substrate 403, devices 401 can be arranged in any pattern, for example in a grid, along an optical bus and/or a waveguide and the like. While four devices 401 are depicted, device 400 can comprises fewer than four devices 401 (similar to device 101) and more than four devices 401 depending on the overall functionality of device 401.

For example device 101 and/or devices 401 can be components of a transmitter in an optical telecommunications system (e.g. an optical telecommunications transmitter) configured to produce, and transmit, multiplexed modulated optical signals at one or more given optical frequencies, and one or more given data rates, the modulated optical signals having data encoded therein using optical ring resonators of devices 101, 401 (e.g. optical ring resonator 109). As such, the one or more given optical frequencies can comprise one or more given carrier optical frequencies including, but not limited to, optical frequencies used in optical telecommunications in a range of about 184.5-238 THz; however other optical frequencies are within the scope of present implementations. Hence, a number of devices 401 can depend on a number of frequencies being modulated and/or multiplexed.

As optical telecommunication transmitters can use a lot of power to maintain a temperature of the optical ring resonators, and/or include many optical ring resonator structures (e.g. one for each frequency being modulated), reducing power according to present implementations results in a more efficient transmitter as compared to transmitters lacking the presently described backside recesses, and furthermore the simplicity of the backside recesses can increase the overall yield as compared to devices that use side etching to create recesses in a device-side.

Persons skilled in the art will appreciate that there are yet more alternative implementations and modifications possible, and that the above examples are only illustrations of one or more implementations. The scope, therefore, is only to be limited by the claims appended hereto.

What is claimed is:
1. A device comprising:
    a substrate having a device-side and a backside opposite the device-side;
    an optical ring resonator located on the device-side of the substrate;
    a heater having a shape complementary to the optical ring resonator, the heater positioned to heat the optical ring resonator;
    one or more metal traces that connect at least to the heater, the metal traces configured to provide power to the heater and extending outward from the heater; and,
    a recess on the backside of the substrate, the recess centered on the optical ring resonator, and having a diameter larger than both respective outer diameters of the optical ring resonator and the heater, the recess further extending laterally into a region of the one or more metal traces, the recess extending from the backside of the substrate to a layer of material at a side of the recess adjacent the device-side of the substrate such that the substrate is hollow from the backside of the substrate to the layer of material at the side of the recess adjacent the device-side of the substrate.

2. The device of claim 1, further comprising: one or more electrodes configured to provide a voltage to the optical ring resonator, the one or more electrodes having an outer diameter larger than the optical ring resonator; and one or more further metal traces that connect to the one or more electrodes and extending outward from the one or more electrodes, the recess having a diameter larger than outer diameters of the one or more electrodes, the recess further extending laterally into a region of the one or more further metal traces.

3. The device of claim 1, wherein the substrate comprises a silicon substrate.

4. The device of claim 1, wherein the heater has a shape complementary to the optical ring resonator.

5. The device of claim 1, further comprising an insulator material encapsulating the optical ring resonator, and the heater.

6. The device of claim 1, wherein the layer of material has a thickness in a range of about 2 microns to about 3 microns.

7. The device of claim 1, wherein the layer of material comprises an insulator material.

8. The device of claim 1, wherein the layer of material comprises an oxide material.

9. The device of claim 1, wherein the recess has a diameter that is at least 50 microns larger than both the respective outer diameters of the optical ring resonator and the heater.

10. The device of claim 1, wherein the recess has a diameter that causes a fraction heat extraction contribution of the one or metal traces to be below 10%.

11. The device of claim 1, wherein the optical ring resonator is located between the device-side of the substrate and the heater.

12. The device of claim 1, wherein the recess comprises a partially through-silicon via.

13. The device of claim 1, further comprising: a plurality of optical ring resonators, a plurality of heaters, and a plurality of metal traces, all in a one-to-one relationship, and arranged on the device-side of the substrate; and a plurality of recesses in the backside of the substrate, in a one-to-one relationship with the plurality of optical ring resonators.

14. The device of claim 13, further comprising a spacing between the plurality of optical ring resonators that minimizes heat flow there between.

15. The device of claim 1, wherein the diameter of the recess is about constant from the backside of the substrate to the layer of material at the side of the recess adjacent the device-side of the substrate.

16. The device of claim 1, wherein the recess forms a cavity in the backside of the substrate.

* * * * *